United States Patent
Boyle et al.

(10) Patent No.: US 6,708,251 B1
(45) Date of Patent: Mar. 16, 2004

(54) DISK DRIVE HAVING SEPARATE INTERFACES FOR HOST COMMANDS AND AUDIOVISUAL DATA

(75) Inventors: William B. Boyle, Lake Forest, CA (US); Ronald G. Parkinen, Lake Forest, CA (US)

(73) Assignees: Keen Personal Media, Inc., Lake Forest, CA (US); Keen Personal Technologies, Inc., Lake Forest, CA (US)

(*) Notice: Subject to any disclaimer, the term of this patent is extended or adjusted under 35 U.S.C. 154(b) by 121 days.

(21) Appl. No.: 09/872,189

(22) Filed: May 31, 2001

(51) Int. Cl.[7] ............................................. G06F 13/00
(52) U.S. Cl. ..................... 711/112; 386/35; 386/46; 386/64
(58) Field of Search .......................... 711/112; 386/35, 386/46, 64

(56) References Cited

U.S. PATENT DOCUMENTS

| | | | |
|---|---|---|---|
| 4,977,455 A | 12/1990 | Young | 348/460 |
| 5,541,738 A | 7/1996 | Mankovitz | 386/83 |
| 5,809,209 A | 9/1998 | Hoshi et al. | 386/124 |
| 5,923,817 A | 7/1999 | Nakamura | 386/124 |
| 6,088,507 A | 7/2000 | Yamauchi et al. | 386/95 |
| RE36,801 E * | 8/2000 | Logan et al. | 348/571 |
| 6,105,107 A | 8/2000 | Ho et al. | 711/112 |
| 6,169,543 B1 * | 1/2001 | Wehmeyer | 345/721 |
| 6,178,480 B1 * | 1/2001 | Tobagi et al. | 711/114 |
| 6,226,038 B1 * | 5/2001 | Frink et al. | 348/443 |
| 2002/0003949 A1 * | 1/2002 | Mamiya et al. | 386/125 |
| 2002/0009149 A1 * | 1/2002 | Rodriguez et al. | 375/240.25 |

* cited by examiner

Primary Examiner—Reba I. Elmore
(74) Attorney, Agent, or Firm—Milad G. Shara, Esq.; Knobbe, Martens, Olson & Bear LLP (57) ABSTRACT

A disk drive connectable to a host system includes a disk, a buffer memory, and an audiovisual interface responsive to first data from the host system to provide audiovisual data. The disk drive further includes a host command interface adapted to receive host commands from the host system. The disk drive further includes a disk controller coupled to the audiovisual interface, the host command interface, the disk, and the buffer memory. The disk controller is responsive to the host commands to selectively allocate at least a portion of the buffer memory among the audiovisual data, and to selectively transfer the audiovisual data from the audiovisual interface to the buffer memory. The disk controller is further responsive to the host commands to selectively transfer the audiovisual data from the buffer memory to the disk to be stored.

24 Claims, 11 Drawing Sheets

DISK DRIVE HAVING SEPARATE INTERFACES FOR HOST COMMANDS AND AUDIOVISUAL DATA

CROSS-REFERENCE TO RELATED APPLICATIONS

The present application is related to U.S. patent application Ser. No. 09/605,623, filed on Jun. 28, 2000, entitled "Set-Top Box Connectable to a Digital Video Recorder Via an Auxiliary Interface and Selects Between a Recorded Video Signal Received From the Digital Video Recorder and a Real-Time Video Signal to Provide Video Data Stream to a Display Device." The present application is also related to U.S. patent application Ser. No. 09/652,995, filed Aug. 31, 2000, entitled _"Video Recording System Utilizing Storage Redundancy to Transfer Non-Time-Critical, Error-Intolerant Data Segments While Transferring Time-Critical, Error-Tolerant Streaming Data Segments at a Required Data Transfer Rate."

BACKGROUND OF THE INVENTION

1. Field of the Invention

The present invention relates to disk drives, and more particularly, to disk drives used in audiovisual recording systems.

2. Description of the Related Art

Existing video recording systems, such as systems which comprise a personal video recorder, permit users to view audiovisual programming as it is received in real time and to record in non-volatile memory the incoming audiovisual programming for later viewing. A typical system comprises a set-top box and a personal video recorder including a hard disk drive with an IDE (Integrated Drive Electronics) or SCSI (Small Computer System Interface) disk interface for transferring data to and from the hard disk drive. Both the hard disk drive and the personal video recorder electronics typically include cache or buffer memory to facilitate data transfer between the two.

The set-top box receives a plurality of programming channels from a multiple server operator ("MSO"), such as a cable television provider, and includes a tuner which can be used to select a program channel for viewing or recording. The output of the set-top box is typically transmitted to the personal video recorder via an audiovisual interface which includes an MPEG (Motion Picture Experts Group) encoder, or an encoder compatible with another compression standard. The encoder is used to generate digital-formatted, compressed audiovisual data for recording which can then be transferred to the hard disk drive across the disk interface. The process of encoding audiovisual data is typically performed using its own dedicated memory as a "scratchpad."

The single disk interface is also used to play back the recorded audiovisual data by transferring it from the hard disk drive to a display device via an appropriate decoder. As with the process of encoding, the process of decoding is typically performed using a memory dedicated to the decoder.

Besides being used to transfer audiovisual data, the disk interface is also typically used to transfer non-audiovisual data to and from the hard disk drive for storage and retrieval, and to transmit data transfer commands to the hard disk drive. The incoming and outgoing audiovisual data, non-audiovisual data, and the data transfer commands each utilize a fraction of the available bandwidth of the disk interface.

SUMMARY OF THE INVENTION

One aspect of the present invention relates to a disk drive connectable to a host system that includes an audiovisual source, the disk drive comprising a disk, a buffer memory, and an audiovisual interface responsive to first data from the audiovisual source to provide audiovisual data. The disk drive further comprises a host command interface adapted to receive host commands from the host system. The disk drive further comprises a disk controller coupled to the audiovisual interface, the host command interface, the disk, and the buffer memory. The disk controller is responsive to the host commands to selectively allocate at least a portion of the buffer memory for the audiovisual data. The disk controller is further responsive to the host commands to selectively transfer the audiovisual data from the audiovisual interface to the buffer memory. The disk controller is further responsive to the host commands to selectively transfer the audiovisual data from the buffer memory to the disk to be stored.

Another aspect of the present invention relates to a disk drive connectable to a host system, the disk drive comprising a disk having audiovisual first data, a buffer memory, and an output interface. The disk drive further comprises a host command interface that receives host commands from the host system. The disk drive further comprises a disk controller coupled to the output interface, the host command interface, the disk, and the buffer memory. The disk controller is responsive to the host commands to selectively allocate at least a portion of the buffer memory for retrieved audiovisual data. The disk controller is further responsive to selectively transfer the audiovisual first data from the disk to the buffer memory as the retrieved audiovisual first data. The disk controller is further responsive to selectively transfer the retrieved audiovisual data from the buffer memory to the output interface.

Another aspect of the present invention relates to a method of storing and retrieving audiovisual data utilizing a disk drive. The method comprises receiving host commands from a host system at a host command interface. The method further comprises selectively allocating at least a portion of a buffer memory for audiovisual data. The method further comprises receiving first data from the host system at an audiovisual interface. The method further comprises providing digital-formatted audiovisual data in response to the first data. The method further comprises selectively transferring the audiovisual data to the buffer memory in response to the host commands. The method further comprises selectively transferring the audiovisual data from the buffer memory to a disk in response to host commands. The method further comprises selectively allocating at least a second portion of the buffer memory for retrieved audiovisual data. The method further comprises selectively transferring the audiovisual data from the disk to the buffer memory as the retrieved audiovisual data in response to the host commands. The method further comprises selectively transferring the retrieved audiovisual data from the buffer memory to an output interface.

DETAILED DESCRIPTION OF THE PREFERRED EMBODIMENT

Figure 1:
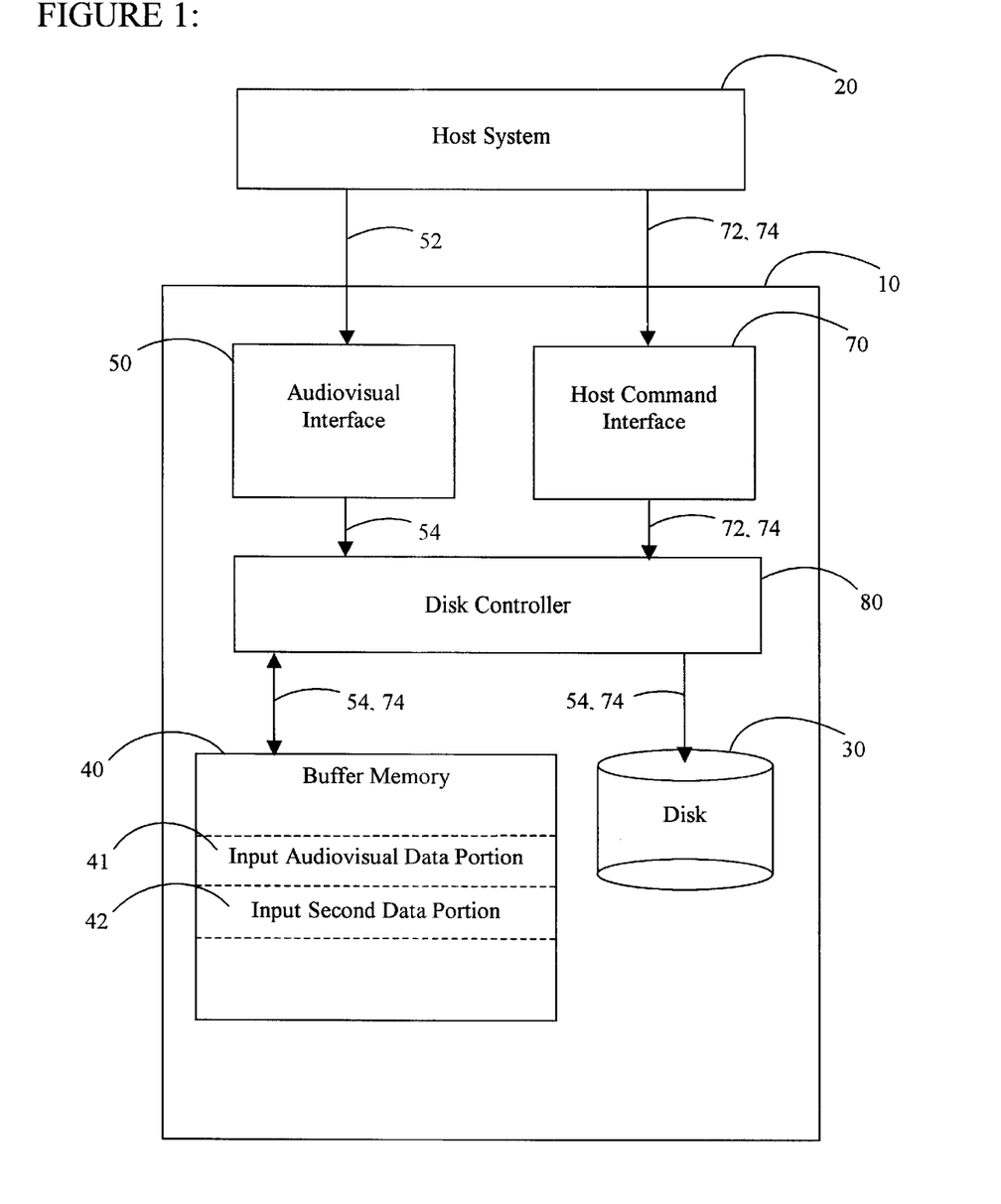
FIG. 1 schematically illustrates a disk drive connectable to a host system in accordance with an embodiment of the present invention.

FIG. 1 schematically illustrates the data flow corresponding to a disk drive 10 connectable to a host system 20 that includes an audiovisual source 22 in accordance with an embodiment of the present invention. The disk drive 10 comprises a disk 30, a buffer memory 40, and an audiovisual interface 50 responsive to first data 52 from the audiovisual source 22 to provide audiovisual data 54. The disk drive 10 further comprises a host command interface 70 adapted to receive host commands 72 from the host system 20. The disk drive 10 further comprises a disk controller 80 coupled to the audiovisual interface 50, the host command interface 70, the disk 30, and the buffer memory 40. The disk controller 80 is responsive to the host commands 72 to selectively allocate at least a portion of the buffer memory 40 for the audiovisual data 54. The disk controller 80 is further responsive to the host commands 72 to selectively transfer the audiovisual data 54 from the audiovisual interface 50 to the buffer memory 40. The disk controller 80 is further responsive to the host commands 72 to selectively transfer the audiovisual data 54 from the buffer memory 40 to the disk 30 to be stored. In the embodiment schematically illustrated in FIG. 1, the host command interface 70 is further adapted to receive second data 74 from the host system 20, and the disk controller 80 is further responsive to the host commands 72 to selectively allocate at least a portion of the buffer memory 40 for the second data 74, selectively transfer the second data 74 from the host command interface 70 to the buffer memory 40, and selectively transfer the second data 74 from the buffer memory 40 to the disk 30 to be stored.

As used herein for FIGS. 1–10, arrows connecting various elements of the disk drive 10 to one another and to the host system 20 depict the data flow among the various elements. These arrows do not depict the physical interfaces between the various elements, and the labels provided for these arrows correspond to the data transferred between the various elements. For example, the double-sided arrow between the disk controller 80 and the buffer memory 40 denotes that data is transferred between these two elements of the disk drive 10, and the label "54, 74" denotes that both audiovisual data 54 and second data 74 are transferred between the disk controller 80 and the buffer memory 40. Thus, other arrows are also labeled to depict the data flow corresponding to the embodiments schematically illustrated in FIGS. 1–10. Persons skilled in the art recognize that each arrow depicting data flow among the various elements of the disk drive 10 can correspond to a single interface or multiple interfaces between the various elements, and can select appropriate configurations in accordance with embodiments of the present invention.

In certain embodiments, the host system 20 comprises a set-top box, for example as described in pending U.S. patent application Ser. No. 09/605,623 (Attorney Ref. No. K35A0619), entitled "Set-Top Box Connectable to a Digital Video Recorder Via an Auxiliary Interface and Selects Between a Recorded Video Signal Received From the Digital Video Recorder and a Real-Time Video Signal to Provide Video Data Stream to a Display Device." Other embodiments of the disk drive 10 are connectable to a host system 20 comprising a personal video recorder. As is described in more detail below, the host system 20 generates host commands 72 which instruct the disk controller 80. Typically, the host system 20 comprises a microprocessor which generates such commands. Persons skilled in the art can provide host system 20 that are compatible with embodiments of the present invention.

Figure 2:
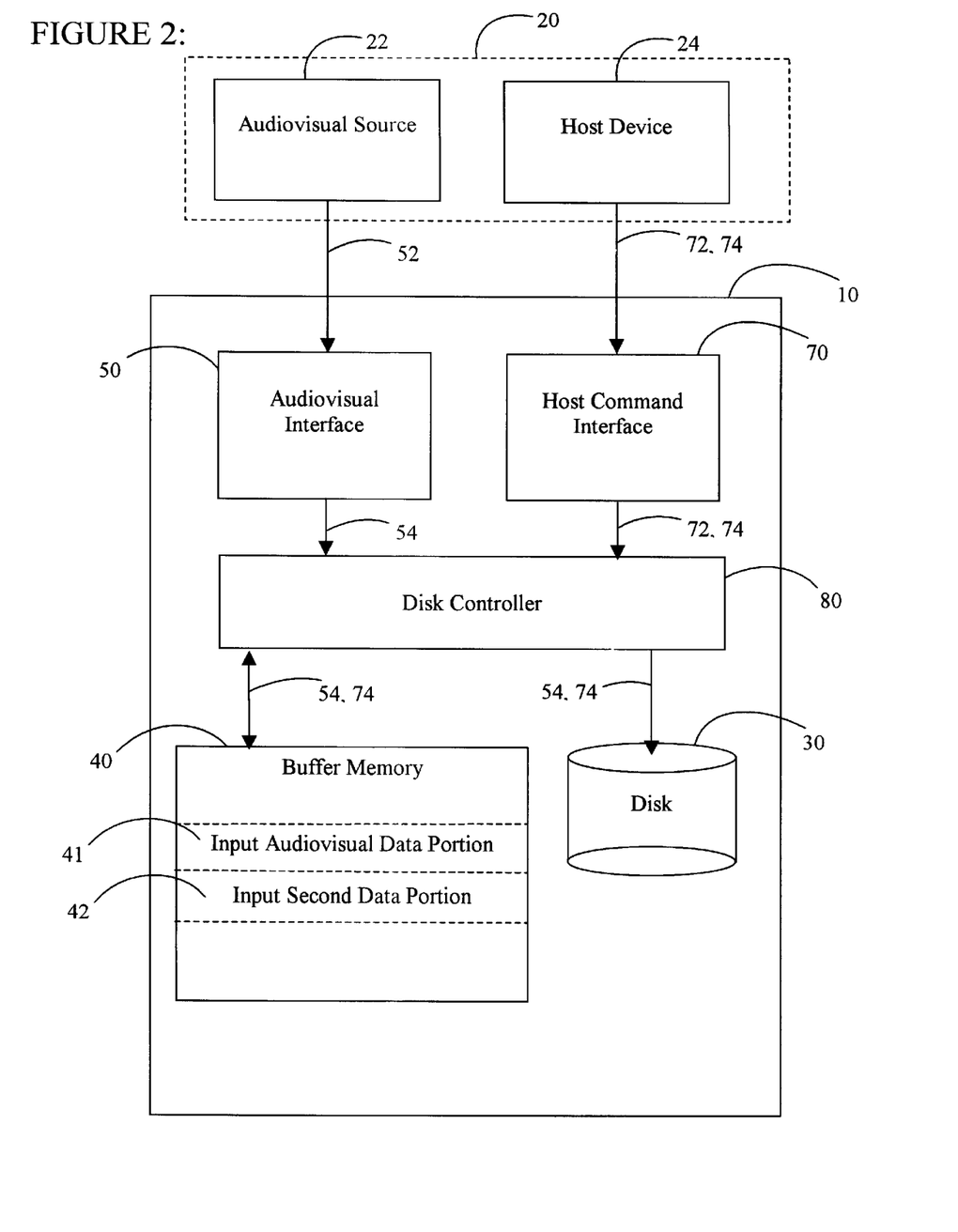
FIG. 2 schematically illustrates an embodiment of the present invention in which the host system comprises an audiovisual source and a host device.
Figure 3:
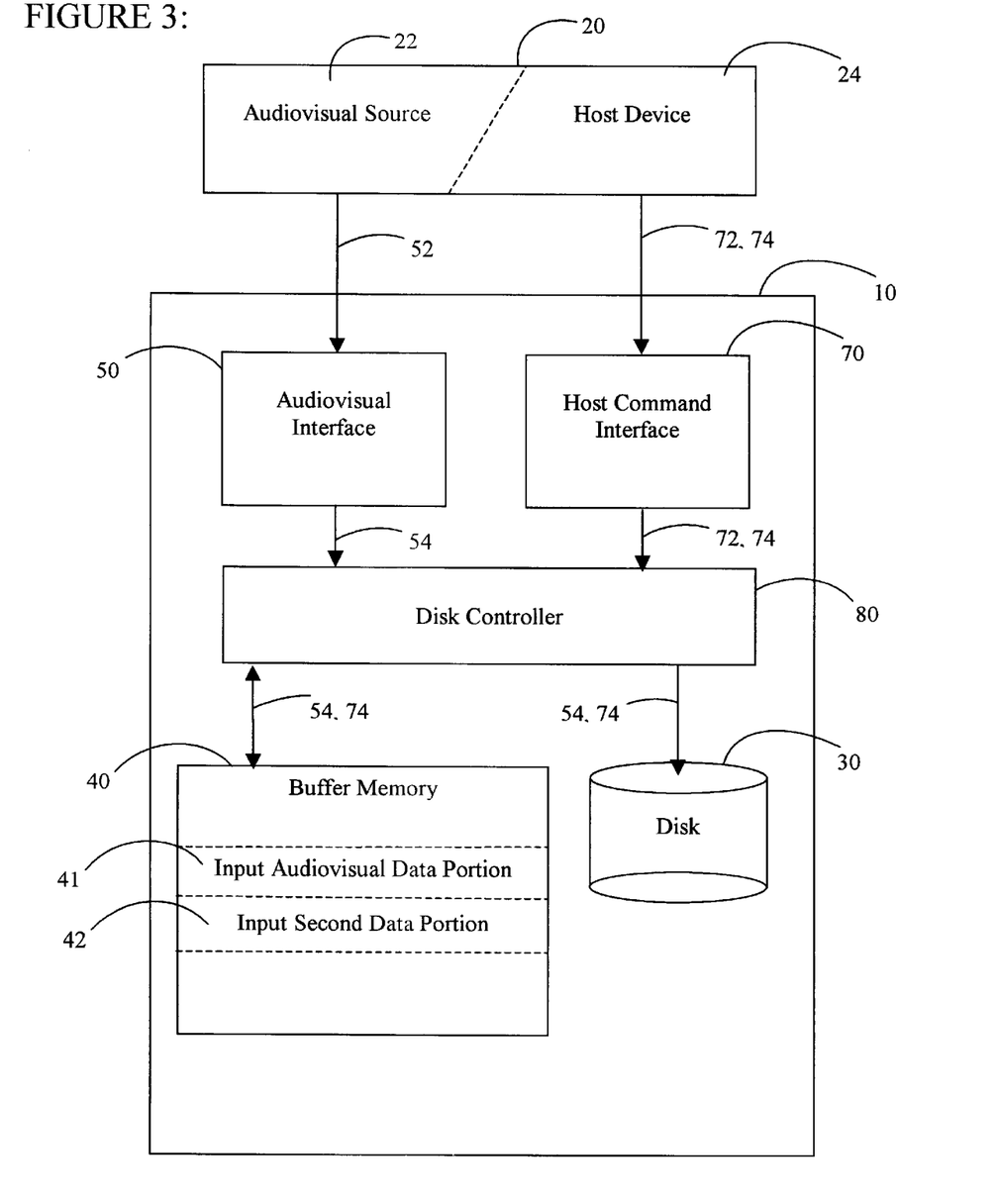
FIG. 3 schematically illustrates an embodiment of the present invention in which the audiovisual interface and host command interface are connectable to a device comprising an audiovisual source and a host device.

In embodiments in which the host system 20 comprises an audiovisual source 22 and a host device 24, such as schematically illustrated in FIG. 2, the audiovisual interface 50 is connectable to the audiovisual source 22 and the host command interface 70 is connectable to the host device 24. The audiovisual source 22 and the host device 24 can each comprise a set-top box, a personal video recorder, or other source of audiovisual information. In certain embodiments, the audiovisual source 22 and the host device 24 comprise a common device (i.e., the audiovisual interface 50 and host command interface 70 are connectable to the same device), as schematically illustrated in FIG. 3. In certain other embodiments, the audiovisual source 22 is an audiovisual data service provider that supplies first data 52 comprising video programming to multiple users. Examples of such audiovisual data service providers include, but are not limited to, cable television systems and satellite systems. Alternatively, the audiovisual source 22 can provide first data 52 which comprises UHF or VHF broadcast signals using an antenna and a tuner. In still other embodiments, the audiovisual source 22 can be a video camera, a video cassette recorder, or the like, that provides first data 52 corresponding to home video programs which the user wants to upload to the disk drive 10. Persons skilled in the art recognize audiovisual sources 22 and first data 52 that are compatible with embodiments of the present invention. Although the audiovisual source 22 may advantageously be a separate device (e.g., a video camera), the audiovisual source 22 is considered to be part of the overall host system 20.

In certain embodiments, the audiovisual interface 50 is responsive to first data 52 from the host system 20, where the first data 52 can be analog-formatted or digital-formatted, and can be encoded and/or encrypted. The audiovisual interface 50 is configured to respond to the first data 52 by generating audiovisual data 54 with a format which is compatible with the other components of the disk drive 10. In certain embodiments, the audiovisual interface 50 can provide audiovisual data 54 corresponding only to the portions of the first data 52 which are selected for recording. Alternatively, in other embodiments, the audiovisual interface 50 can provide audiovisual data 54 to an output interface coupled to a display device to permit viewing of programs as they are being received from the host system 20.

In certain embodiments, the audiovisual interface 50 responds to the first data 52 by generating compressed digital-formatted audiovisual data 54. In embodiments in which the first data 52 is compressed and digital-formatted, the audiovisual interface 50 can pass the first data 52 to other components of the disk drive 10. In embodiments in which the host system 20 provides uncompressed, digital-formatted first data 52, the audiovisual interface 50 can comprise an MPEG (Motion Picture Experts Group) encoder, or some other type of encoder to provide compressed, digital-formatted audiovisual data 54. To provide compatibility of the disk drive 10 with analog-formatted first data 52, the audiovisual interface 50 of one embodiment comprises an analog-to-digital converter and an MPEG encoder.

Furthermore, for particular embodiments that are compatible with encrypted first data 52 (e.g., first data 52 from premium cable channels), the audiovisual interface 50 comprises a decrypter. Alternatively, in other embodiments, the encoding and decrypting functions described above may instead be performed by the disk controller 80, or by some other component of the disk drive 10. Persons skilled in the art are able to provide an audiovisual interface 50 that is responsive to first data 52 from the host system 20 to provide audiovisual data 54 in accordance with embodiments of the present invention.

The host system 20 of certain embodiments provides host commands 72 and second data 74 which are received by the host command interface 70. In certain embodiments, the host commands 72 comprise data transfer commands communicated to the disk controller 80 to initiate various data transfer operations. Examples of host commands 72 include, but are not limited to, read and write commands for audiovisual ("AV") data and for non-audiovisual data (typically referred to as "information technology" or "IT" data), and mode selection commands for the disk drive 10. The host commands 72 can be generated by the host system 20 in response to user input to the host system 20 by which the user controls various operations and parameters of the host system 20 and the disk drive 10, such as playback commands (e.g., pause, instant-replay, etc.). The second data 74 may in certain embodiments be considered to include the host commands 72.

The second data 74 can comprise IT data to be stored on the disk drive 10. Examples of IT data to be stored in certain embodiments include, but are not limited to, electronic program guide ("EPG") information regarding the broadcast schedules for various video programs from various broadcast channels, preference determination information regarding the viewing preferences of various users based on analysis of the users' viewing patterns, and various other algorithms or data utilized by the host system 20. In still other embodiments, the second data 74 can also comprise audiovisual data. In such embodiments, the host command interface 70 can be configured as described above for the audiovisual interface 50.

In certain embodiments, the host command interface 70 is compatible with the IDE (Integrated Drive Electronics) standard and/or the SCSI (Small Computer System Interface) standard. In still other embodiments, the host command interface 70 is compatible with the IEEE 1394 standard, which is described in the "IEEE Std 1394–1995 IEEE Standard for a High Performance Serial Bus," Aug. 30, 1996, which is incorporated in its entirety by reference herein. Persons skilled in the art are able to select an appropriate configuration of the host command interface 70 compatible with the present invention.

In certain embodiments, the disk 30 comprises a rotating magnetic storage medium. Alternatively, the disk 30 can be a writable digital video disk ("DVD"), or another technology that provides writable non-volatile storage. Persons skilled in the art can provide a disk 30 in accordance with embodiments of the present invention.

In certain embodiments, the buffer memory 40 comprises a temporary storage area that is used to compensate for differences in the data transfer and processing rates between the disk drive 10 and the devices connected to the disk drive 10. For example, the buffer memory 40 allows "staging" of incoming streaming audiovisual data by temporarily storing the audiovisual data in preparation of transferring it to the disk 30 in burst form. Similarly, the buffer memory 40 can be used to produce streaming audiovisual data transferred from the disk 30 in burst form. Such a buffer memory 40 compatible with embodiments of the present invention is described in co-pending U.S. patent application Ser. No. 09/652,995, (Attorney Ref. No. K35A0646), entitled "Video Recording System Utilizing Storage Redundancy to Transfer Non-Time-Critical, Error-Intolerant Data Segments While Transferring Time-Critical, Error-Tolerant Streaming Data Segments at a Required Data Transfer Rate," which is incorporated in its entirety by reference herein.

The buffer memory 40 can be partitioned into a plurality of memory portions, each portion containing data from various sources. For example, a portion of the buffer memory 40 can be allocated to data being transferred from a connected device onto the disk 30, while a second portion of the buffer memory 40 can be allocated to data being transferred from the disk 30 to the connected device. In accordance with embodiments of the present invention, the buffer memory 40 can be selectively allocated among a plurality of data source devices and data receiving devices.

The disk controller 80 is coupled to the audiovisual interface 50, the host command interface 70, the disk 30, and the buffer memory 40. In certain embodiments, the disk controller 80 can comprise a FIFO buffer for each component with which the disk controller 80 transfers data. The disk controller 80 comprises a chip or circuit that in response to host commands 72 allocates the buffer memory 40 and controls the transfer of data between the buffer memory 40 and the disk 30, audiovisual interface 50, host command interface 70, and any other components of the disk drive 10 which utilize the buffer memory 40. In certain embodiments, the disk controller 80 encodes, decodes, and separates the host commands 72 from the second data 74. Disk controllers 80 compatible with the present invention can conform to various standards, as described above in relation to the host command interface 70. Persons skilled in the art are able to configure a disk controller 80 in accordance with embodiments of the present invention.

In response to host commands 72 from the host device 20 via the host command interface 70, the disk controller 80 of certain embodiments selectively allocates at least a portion of the buffer memory 40 among the audiovisual data 54 and the second data 74. As used herein, the term "selectively"

with regard to the response of the disk controller 80 denotes that the disk controller 80 selects the timing of the operation, or selects the portion of the data to be acted upon. The term "selectively" does not denote that the disk controller 80 can select whether to perform the operation or not. As schematically illustrated in FIG. 1, upon allocation, the buffer memory 40 has an input audiovisual data portion 41 and an input second data portion 42. In certain embodiments, the fractions of the buffer memory 40 allocated to the input audiovisual data portion 41 and the input second data portion 42 are dynamically adjusted to satisfy the memory requirements for the transfer of the data to the disk 30. For example, in instances where there is a large amount of audiovisual data 54 to be transferred from the audiovisual interface 50, but a relatively small amount of second data 74, the fraction of the buffer memory 40 allocated to the input audiovisual data portion 41 can be increased while the fraction of the buffer memory 40 allocated to the input second data portion 42 can be reduced.

In response to host commands 72 corresponding to writing the audiovisual data 54 to the disk 30, the disk controller 80 selectively transfers the audiovisual data 54 from the audiovisual interface 50 to the portion of the buffer memory 40 allocated for the audiovisual data 54, i.e., the input audiovisual data portion 41. The disk controller 80 also selectively transfers the audiovisual data 54 from the input audiovisual data portion 41 of the buffer memory 40 to the disk 30. In response to host commands 72 corresponding to writing the second data 74 to the disk 30, the disk controller 80 of certain embodiments selectively transfers the second data 74 from the host command interface 70 to the portion of the buffer memory 40 allocated for the second data 74, i.e., the input second data portion 42. The disk controller 80 of certain embodiments also selectively transfers the second data 74 from the input second data portion 42 of the buffer memory 40 to the disk 30.

By not transferring the audiovisual data 54 to and from the disk drive 10 over the host command interface 70, more bandwidth is available for the host commands 72 and second data 74. In embodiments in which a large amount of audiovisual data 54 is transferred, the use of the separate audiovisual interface 50 avoids problems due to the limited bandwidth of the host command interface 70.

Figure 4:
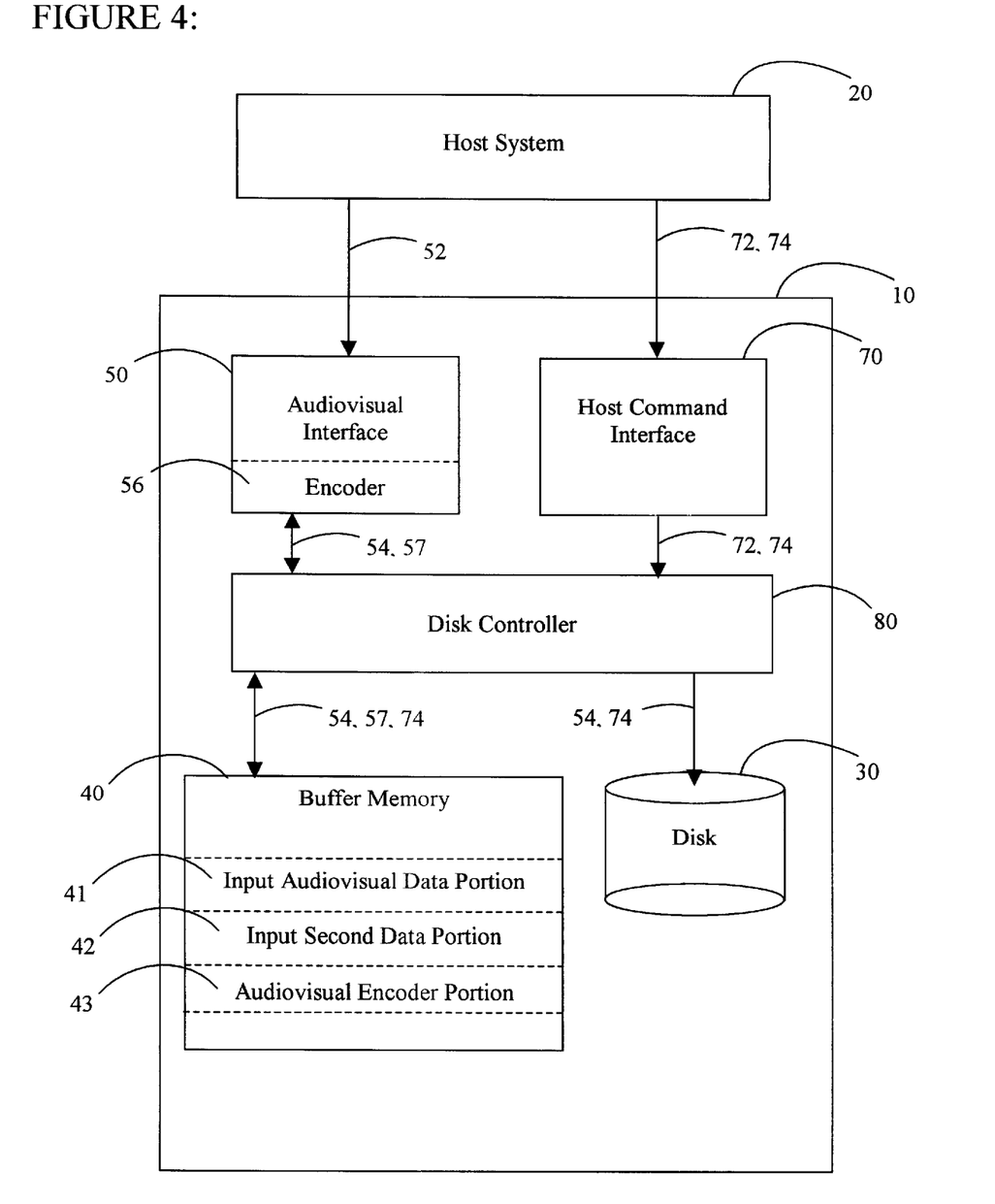
FIG. 4 schematically illustrates an embodiment of the present invention comprising an audiovisual interface with an encoder which utilizes a portion of the buffer memory.

In certain embodiments in which the audiovisual interface 50 comprises an encoder 56, such as schematically illustrated in FIG. 4, the encoder 56 utilizes a portion of the buffer memory 40. In typical video recording systems, encoders are external to the disk drive 10, and each encoder has its own dedicated buffer memory which is used as a "scratchpad" during the encoding process. The information contained in the encoder's buffer memory (i.e., uncompressed and compressed audiovisual data) can duplicate information contained in the buffer memory 40 of the disk drive 10. In the embodiment of the present invention schematically illustrated in FIG. 4, the audiovisual encoder portion 43 of the buffer memory 40 coexists with the input audiovisual data portion 41 and the input second data portion 42 and is utilized to buffer scratchpad data 57 from the encoder 56. In certain embodiments, the sizes of these portions of the buffer memory 40 are dynamically adjusted by the disk controller 80 to optimize the performance of the disk drive 10 in response to buffer demands.

Figure 5:
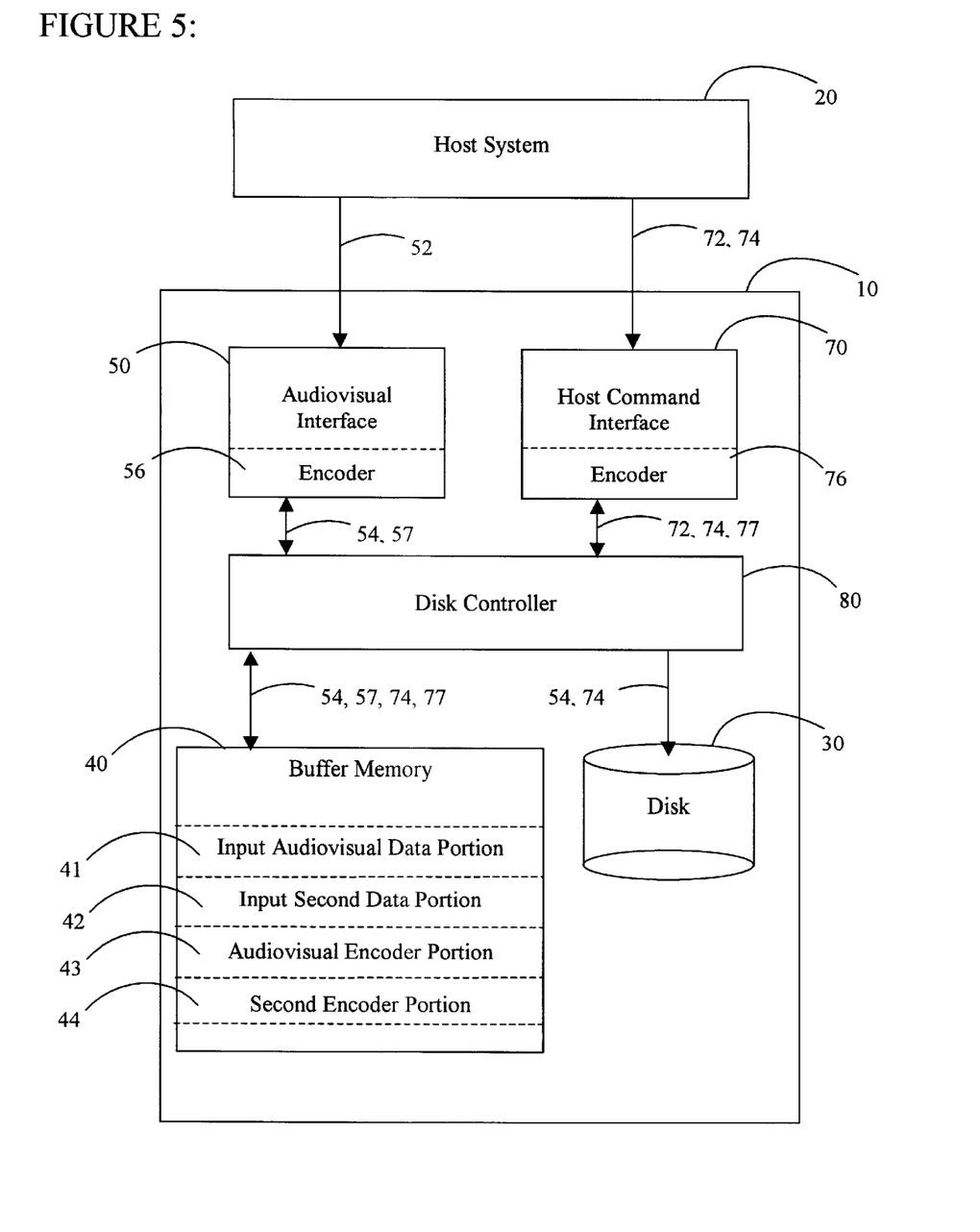
FIG. 5 schematically illustrates an embodiment of the present invention comprising an audiovisual interface with an encoder which utilizes a portion of the buffer memory and a host command interface with an encoder which utilizes a portion of the buffer memory.

Similarly, in other embodiments, the host command interface 70 comprises an encoder 76 which utilizes a portion of the buffer memory 40, such as schematically illustrated in FIG. 5. The encoder 76 of the host command interface 70 utilizes a second encoder portion 44 which coexists with the other portions of the buffer memory 40 to buffer scratchpad data 77 from the encoder 76.

By placing the encoders and decoders (described in more detail below) in the disk drive 10 and sharing the buffer memory 40 of the disk drive 10 to satisfy the memory requirements of the encoders and decoders, embodiments of the present invention reduce the total amount of memory needed by the video recording system. In addition, embodiments of the present invention enable smaller mechanical dimensions for a personal video recorder as well as a simpler system implementation. A disk drive 10 compatible with the present invention can be utilized as a stand-alone disk drive for a low-cost personal video recorder.

Figure 6:
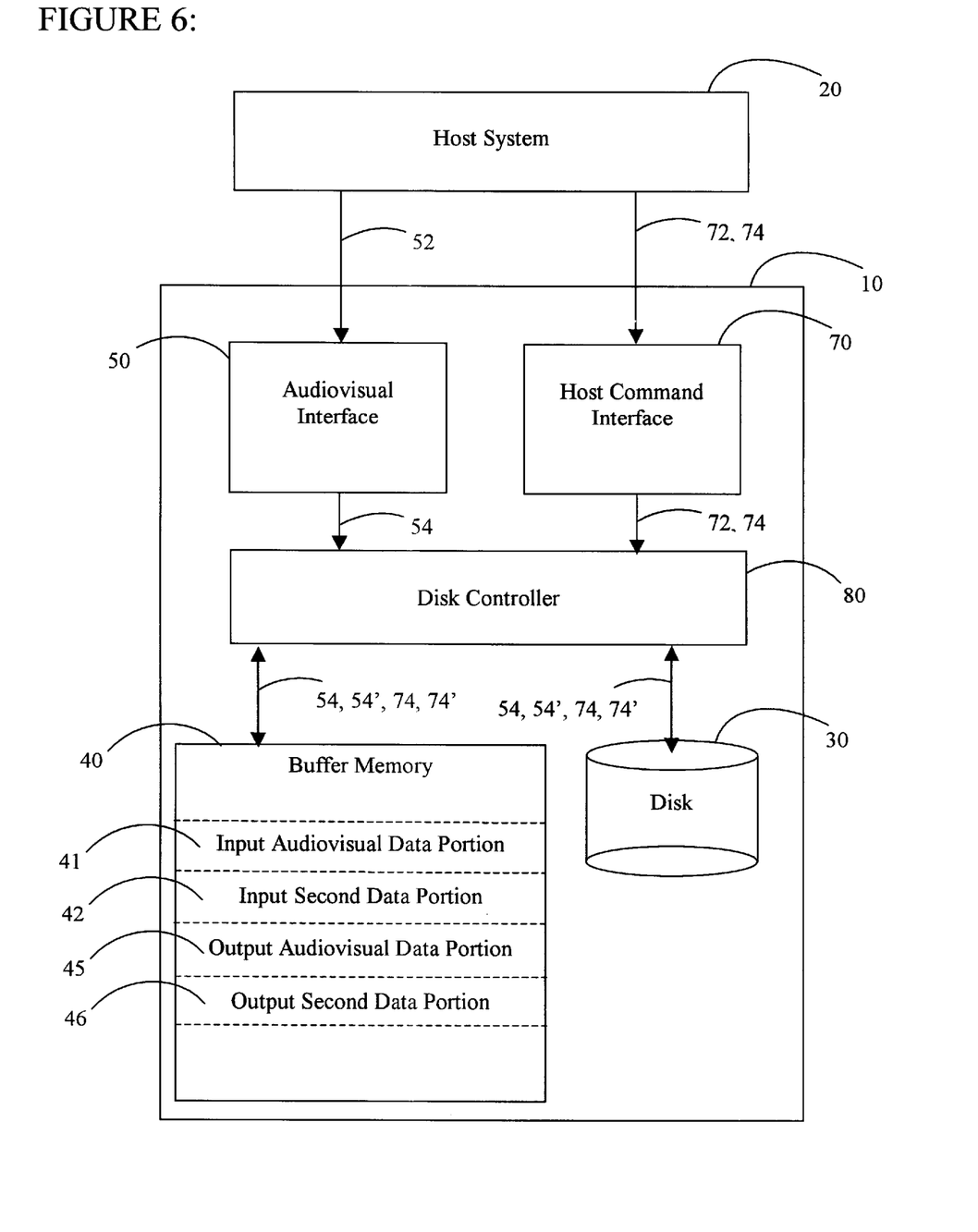
FIG. 6 schematically illustrates an embodiment of the present invention in which the audiovisual data and second data are retrieved from the disk.

In certain embodiments, the disk controller 80 is further responsive to the host commands 72 corresponding to reading or retrieving audiovisual data 54' or second data 74' from the disk 30 by selectively transferring the audiovisual data 54' or second data 74', respectively, to the buffer memory 40 from the disk 30. In such embodiments, the disk controller 80 selectively allocates at least a second portion of the buffer memory 40 among the audiovisual data 54' and the second data 74' transferred from the disk 30. FIG. 6 schematically illustrates such an embodiment of the present invention. Besides the input audiovisual data portion 41 and the input second data portion 42, the buffer memory 40 also has an output audiovisual data portion 45 and an output second data portion 46 corresponding to the audiovisual data 54' and the second data 74' read from the disk 30.

Figure 7:
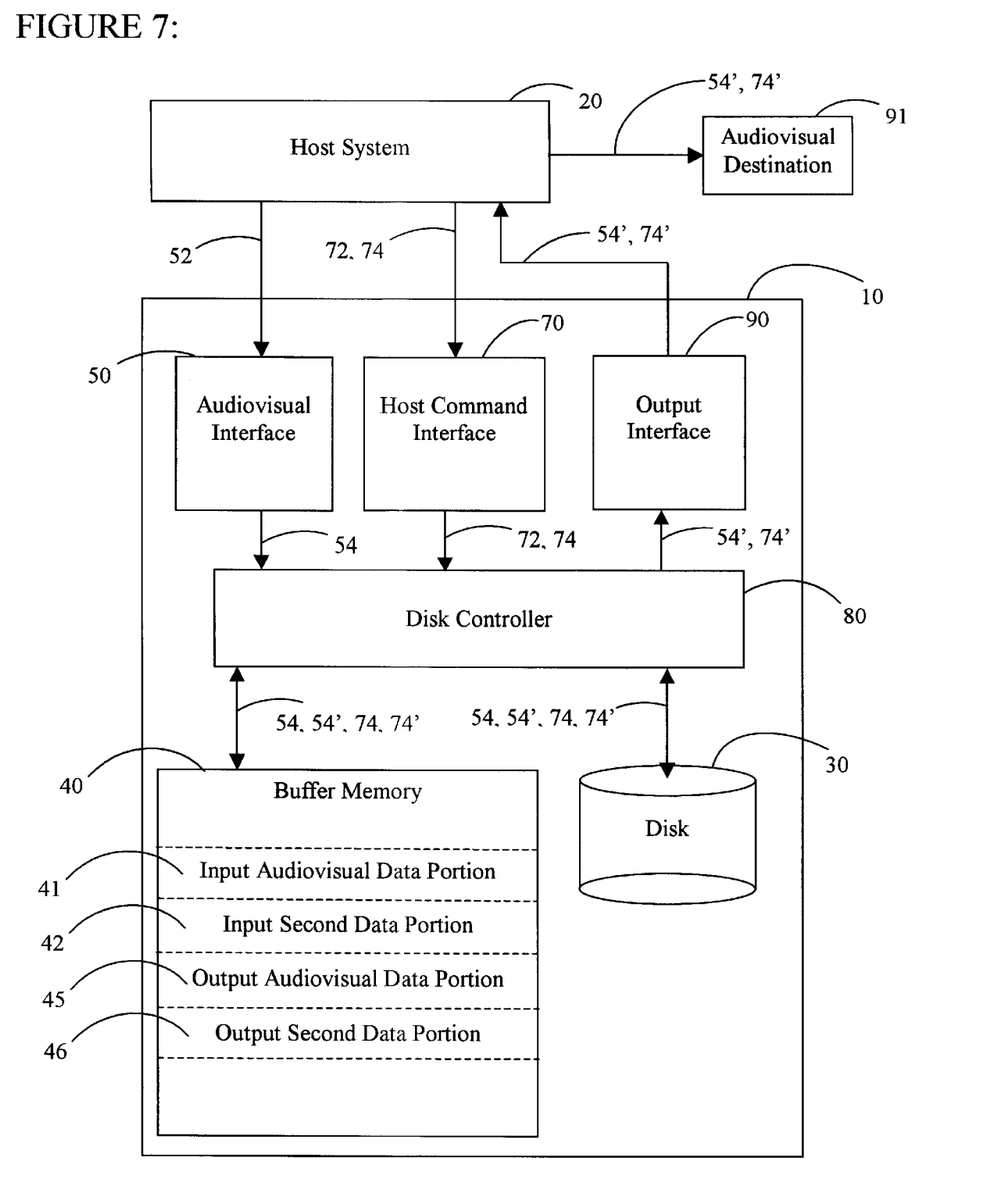
FIG. 7 schematically illustrates an embodiment of the present invention in which the disk drive comprises an output interface connectable to the host system.
Figure 8:
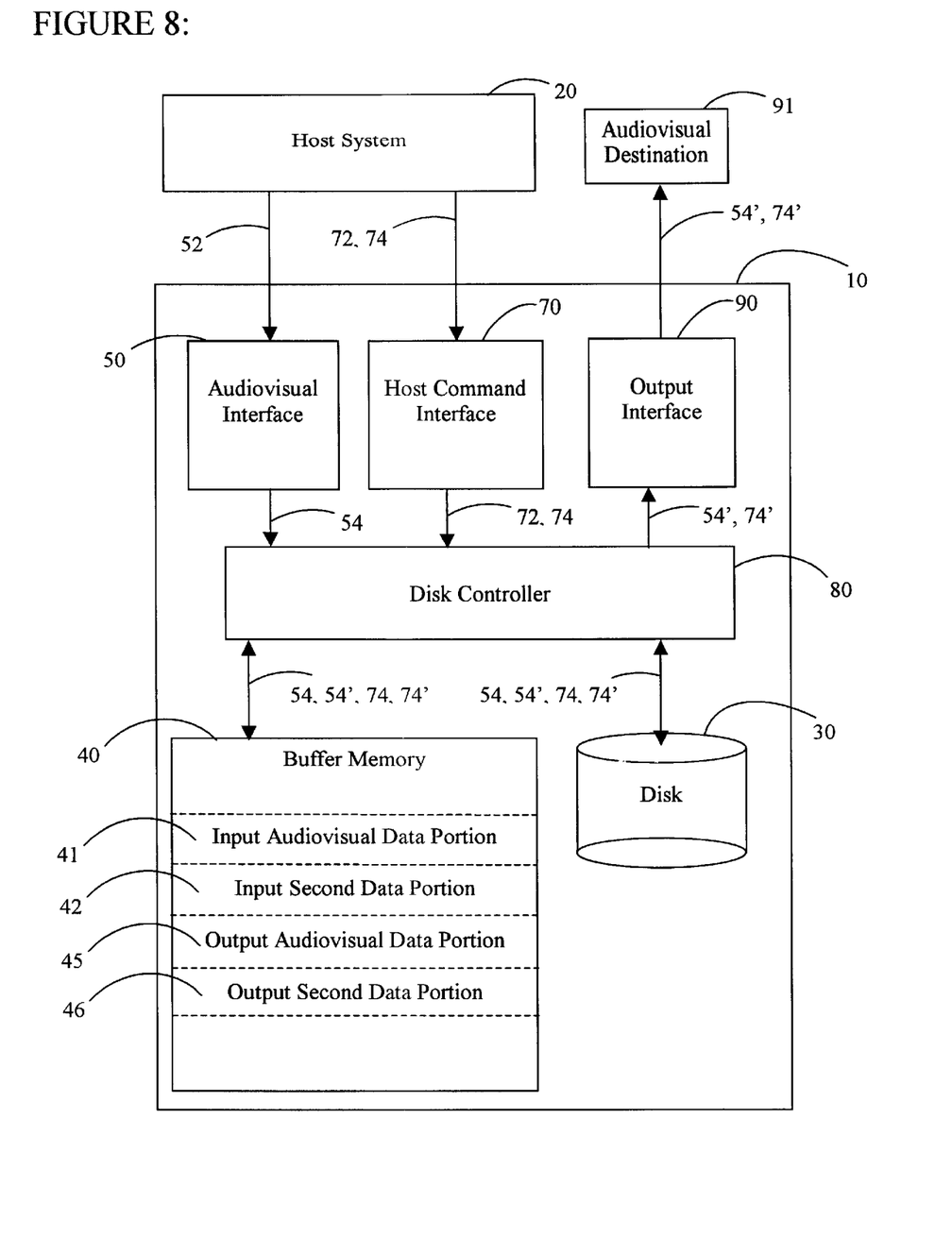
FIG. 8 schematically illustrates an embodiment of the present invention in which the output interface is directly connectable to an audiovisual destination.

Certain embodiments of the disk drive 10 provide the retrieved audiovisual data 54' and retrieved second data 74' from the disk 30 to an output interface 90 which can be connectable to various devices. For example, as schematically illustrated in FIG. 7, the output interface 90 is coupled to the disk controller 80, and the output interface 90 is connectable to the host system 20 which is connectable to an audiovisual destination 91. Examples of an audiovisual destination 91 compatible with the present invention include, but are not limited to, a display device, a network, and a processor. In other embodiments, the output interface 90 is connectable directly to the audiovisual destination 91, as schematically illustrated in FIG. 8. The disk controller 80 schematically illustrated in FIG. 7 is responsive to host commands 72 by selectively transferring the audiovisual data 54' from the output audiovisual data portion 45 and second data 74' from the output second data portion 46 of the buffer memory 40 via the output interface 90 to the host system 20.

Figure 9:
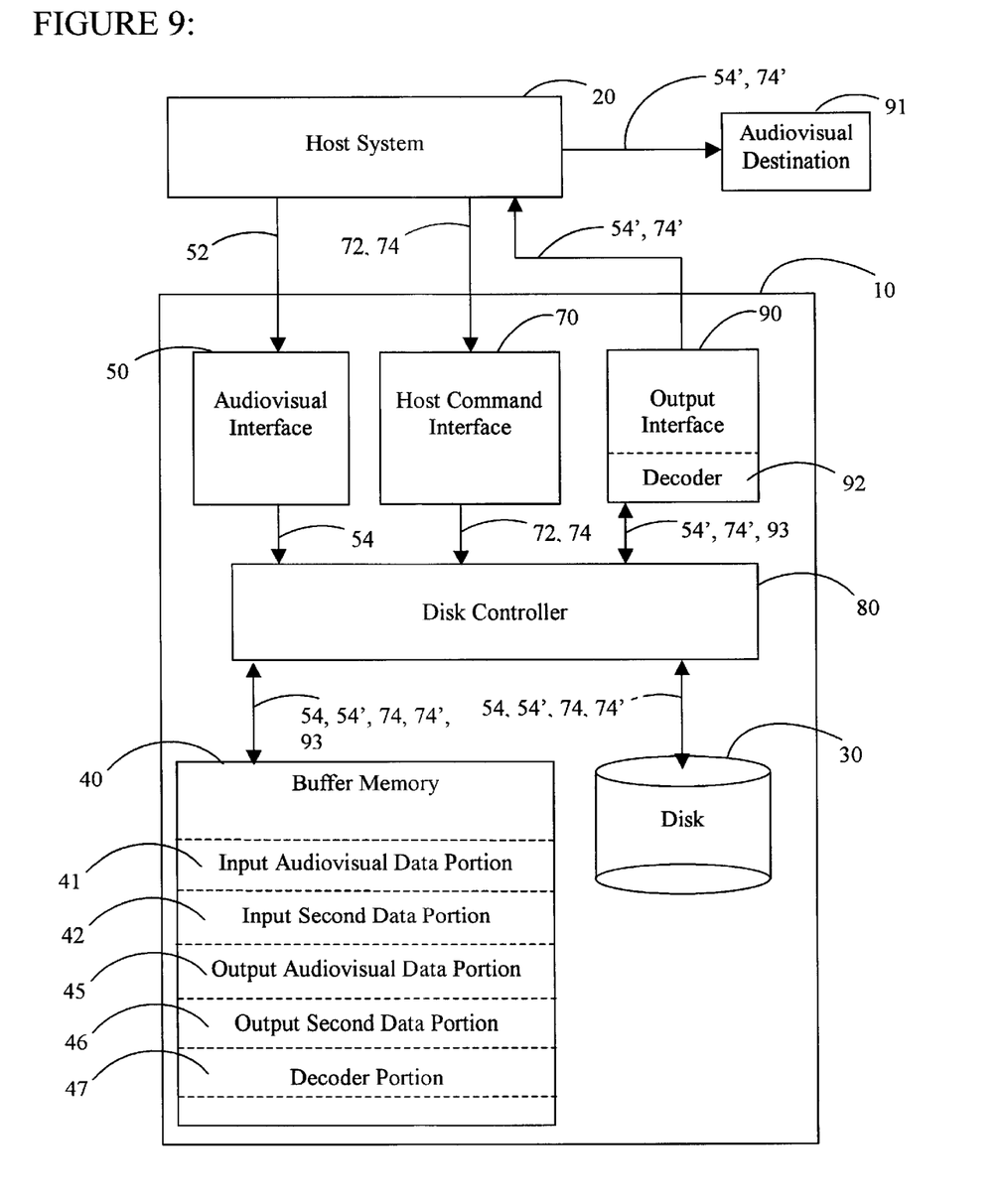
FIG. 9 schematically illustrates an embodiment of the present invention in which the disk drive comprises an output interface with a decoder which utilizes a portion of the buffer memory.

In certain embodiments, the output interface 90 comprises a decoder 92 which utilizes a portion of the buffer memory 40, as schematically illustrated in FIG. 9. As described above in relation to the encoder 56 of the audiovisual interface 50 and the encoder 76 of the host command interface 70, the decoder 92 of the output interface 90 can use a decoder portion 47 of the buffer memory 40 to buffer scratchpad data 93 from the decoder 92.

Figure 10:
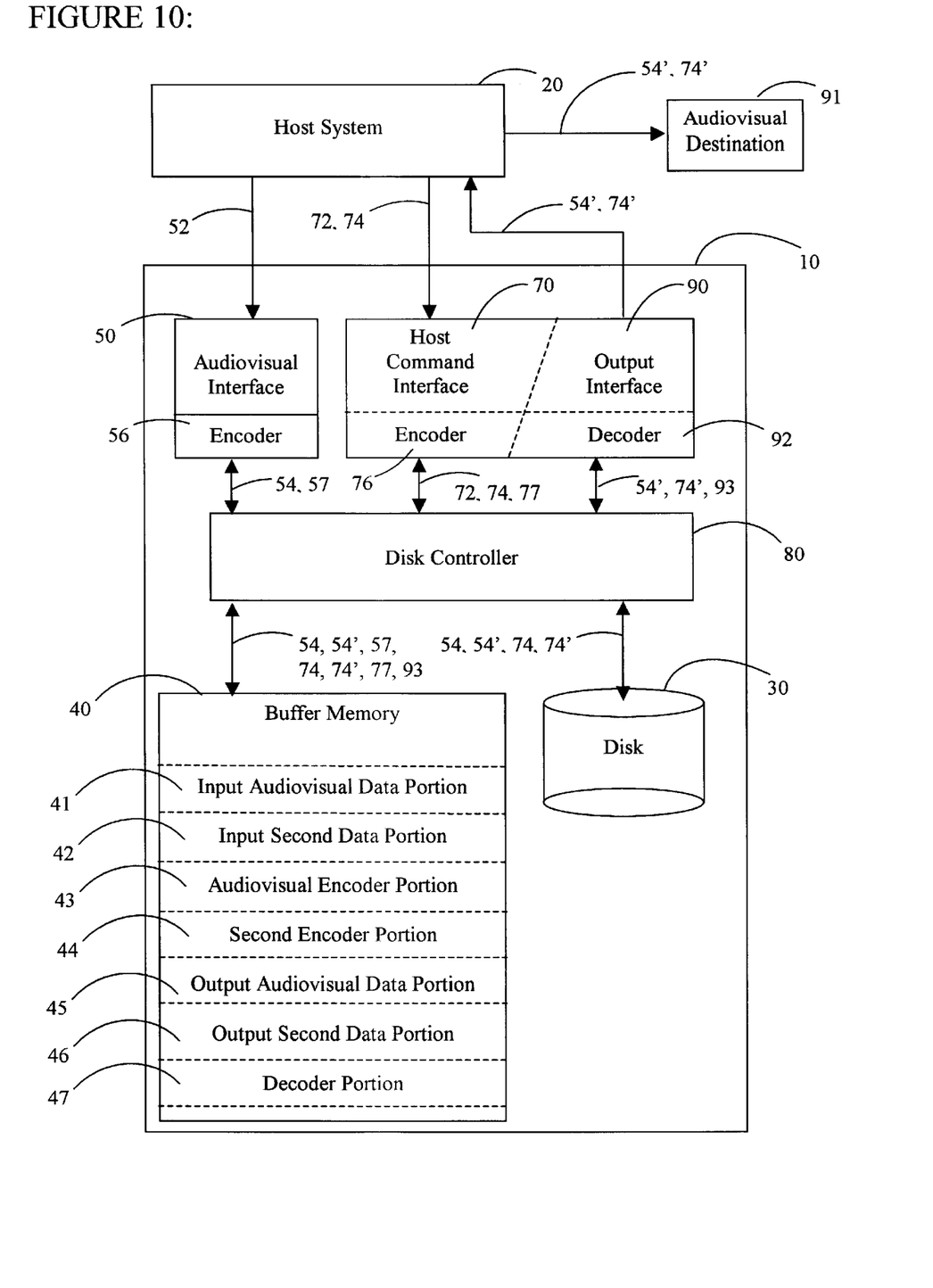
FIG. 10 schematically illustrates an embodiment of the present invention in which the host command interface and output interface comprise a common interface.

Similarly, in other embodiments of the disk drive 10, the host command interface 70 and the output interface 90 comprise a common interface, as schematically illustrated in FIG. 10. In alternative embodiments, the disk drive 10 can comprise multiple output interfaces. For example, the retrieved audiovisual data 54' can be selectively transferred from the buffer memory 40 to an output interface, and the retrieved second data 74' can be selectively transferred from the buffer memory 40 to a second output interface. Furthermore, the embodiment schematically illustrated in FIG. 10 includes encoders 56, 76 as described above. In such embodiments, the disk controller 80 can dynamically allocate the buffer memory 40 among the input audiovisual data portion 41, the input second data portion 42, the audiovisual encoder portion 43, the second encoder portion 44, the output audiovisual data portion 45, the output second data portion 46, and the decoder portion 47.

Figure 11:
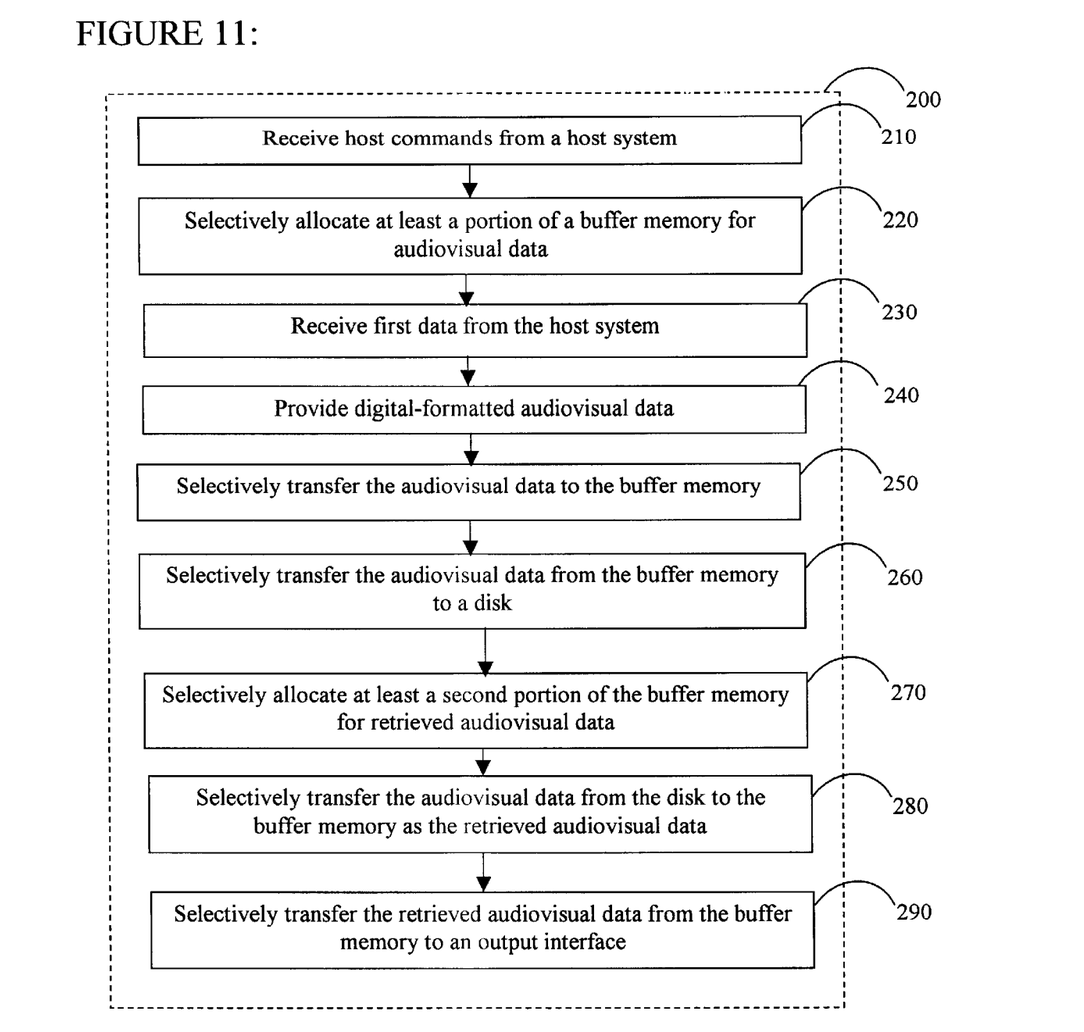
FIG. 11 is a flow diagram of an embodiment of the present invention.

FIG. 11 is a flow diagram of a method 200 in accordance with an embodiment of the present invention in which audiovisual data 54, 54' and second data 74, 74' are stored and retrieved utilizing a disk drive 10. The flow diagram is described with reference to the disk drive 10 and its components as described above. Persons skilled in the art are able to recognize that, while the flow diagram illustrates a particular embodiment with steps in a particular order, other embodiments with different orders of steps are also compatible with the present invention.

In an operational block 210, host commands 72 are received from a host system 20 at a host command interface 70. At least a portion of the buffer memory 40 is selectively allocated among audiovisual data 54 in an operational block 220. In an operational block 230, first data 52 is received from the host system 20 at an audiovisual interface 50. In an operational block 240, digital-formatted audiovisual data 54 is provided in response to the first data 52. As described above, the audiovisual data 54 has a format compatible with the other components of the disk drive 10.

The audiovisual data 54 are selectively transferred to the buffer memory 40 in response to the host commands in an operational block 250. The audiovisual data 54 are selectively transferred from the buffer memory 40 to a disk 30 in response to host commands 72 in an operational block 260. In an operational block 270, at least a second portion of the buffer memory 40 is selectively allocated among retrieved audiovisual data 54'. The audiovisual data 54' is selectively transferred from the disk 30 to the buffer memory 40 as the retrieved audiovisual data 54' in response to the host commands 72 in an operational block 280. The retrieved audiovisual data 54' is selectively transferred from the buffer memory 40 to an output interface in an operational block 290.

In certain embodiments, the method 200 further comprises selectively allocating at least a portion of the buffer memory 40 for second data 74, receiving the second data 74 from the host system 20 at the host command interface 70, selectively transferring the second data 74 to the buffer memory 40 in response to the host commands 72, and selectively transferring the second data 74 from the buffer memory 40 to a disk 30 in response to the host commands 72. The method 200 of certain embodiments also comprises selectively allocating at least a third portion of the buffer memory 40 for retrieved second data 74', selectively transferring the second data 74' from the disk 30 to the buffer memory 40 as the retrieved second data 74' in response to the host commands 72, and selectively transferring the retrieved second data 74' from the buffer memory 40 to a second output interface.

In certain embodiments, the output interface is connectable to the host system 20, which in certain embodiments, comprises a display device. Also in certain embodiments, the second output interface is connectable to the host system 20, while in other embodiments, the output interface and the second output interface comprise a common interface.

What is claimed is:

1. A disk drive connectable to a host system that includes an audiovisual source, the disk drive comprising:

a disk;

a buffer memory;

an audiovisual interface adapted to be coupled to the audiovisual source in the host system, the audiovisual interface responsive to first data from the audiovisual source to provide audiovisual data;

a host command interface separately operable from the audiovisual interface, the host command interface adapted to be coupled to the host system and to receive host commands from the host system; and a disk controller coupled to the audiovisual interface, the host command interface, the disk, and the buffer memory, the disk controller responsive to the host commands to:

selectively allocate at least a portion of the buffer memory for the audiovisual data, selectively transfer the audiovisual data from the audiovisual interface to the buffer memory, and selectively transfer the audiovisual data from the buffer memory to the disk to be stored.

2. The disk drive of claim 1, wherein the host command interface is further adapted to receive second data from the host system, and the disk controller is further responsive to the host commands to:

selectively allocate at least a portion of the buffer memory for the second data, selectively transfer the second data from the host command interface to the buffer memory, and selectively transfer the second data from the buffer memory to the disk to be stored.

3. The disk drive of claim 2, wherein the host system further comprises a host device, the audiovisual interface connectable to the audiovisual source and the host command interface connectable to the host device.

4. The disk drive of claim 2, wherein the audiovisual interface comprises an encoder which utilizes a portion of the buffer memory.

5. The disk drive of claim 2, wherein the host command interface comprises an encoder which utilizes a portion of the buffer memory.

6. The disk drive of claim 2, wherein the disk controller is further responsive to the host commands to selectively transfer the audiovisual data to the buffer memory from the disk, to selectively transfer the second data to the buffer memory from the disk, and to selectively allocate at least a portion of the buffer memory among the audiovisual data transferred from the disk and the second data transferred from the disk.

7. The disk drive of claim 6, wherein the disk drive further comprises an output interface and the disk controller is further responsive to the host commands to selectively transfer the audiovisual data from the buffer memory to the output interface.

8. The disk drive of claim 7, wherein the output interface comprises a decoder which utilizes a portion of the buffer memory.

9. The disk drive of claim 6, wherein the disk controller is further responsive to the host commands to selectively transfer the audiovisual data from the buffer memory to the host device via the host command interface.

10. The disk drive of claim 9, wherein the host command interface comprises a decoder which utilizes a portion of the buffer memory.

11. The disk drive of claim 6, wherein the disk controller is further responsive to the host commands to selectively transfer the second data from the buffer memory to the host device via the host command interface.

12. A disk drive connectable to a host system, the disk drive comprising:

a disk having audiovisual first data;

a buffer memory;

an audiovisual interface adapted to be coupled to the host system and to receive audiovisual data from the host system;

an output interface;

a host command interface separately operable from the audiovisual interface and the output interface, the host command interface adapted to be coupled to the host system and to receive host commands from the host system; and a disk controller coupled to the output interface, the host command interface, the disk, and the buffer memory, the disk controller responsive to the host commands to:

selectively allocate at least a portion of the buffer memory for retrieved audiovisual data;

selectively transfer the audiovisual first data from the disk to the buffer memory as the retrieved audiovisual first data; and selectively transfer the retrieved audiovisual data from the buffer memory to the output interface.

13. The disk drive of claim 12, wherein the disk further has second data, and the disk controller is further responsive to the host commands to:

selectively allocate at least a portion of the buffer memory for the second data;

selectively transfer the second data from the disk to the buffer memory as the retrieved second data; and selectively transfer the retrieved second data from the buffer memory to the output interface.

14. The disk drive of claim 13, wherein the output interface is connectable to an audiovisual destination.

15. The disk drive of claim 14, wherein the audiovisual destination comprises a display device.

16. The disk drive of claim 14, wherein the host system comprises the audiovisual destination.

17. The disk drive of claim 13, wherein the output interface comprises a decoder which utilizes a portion of the buffer memory.

18. A method of storing and retrieving audiovisual data utilizing a disk drive, the method comprising:

receiving host commands from a host system at a host command interface;

selectively allocating at least a portion of a buffer memory for audiovisual data;

receiving first data from the host system at an audiovisual interface separately operable from the host command interface;

providing digital-formatted audiovisual data in response to the first data;

selectively transferring the audiovisual data to the buffer memory in response to the host commands;

selectively transferring the audiovisual data from the buffer memory to a disk in response to host commands;

selectively allocating at least a second portion of the buffer memory for retrieved audiovisual data;

selectively transferring the audiovisual data from the disk to the buffer memory as the retrieved audiovisual data in response to the host commands; and selectively transferring the retrieved audiovisual data from the buffer memory to an output interface.

19. The method of claim 18 further comprising:

selectively allocating at least a portion of the buffer memory for second data;

receiving the second data from the host system at the host command interface;

selectively transferring the second data to the buffer memory in response to the host commands;

selectively transferring the second data from the buffer memory to a disk in response to host commands;

selectively allocating at least a third portion of the buffer memory for retrieved second data;

selectively transferring the second data from the disk to the buffer memory as the retrieved second data in response to the host commands; and selectively transferring the retrieved second data from the buffer memory to a second output interface.

20. The method of claim 19, wherein the host system comprises an audiovisual source, the audiovisual interface connectable to the audiovisual source.

21. The method of claim 19, wherein the host system comprises an audiovisual destination, the output interface connectable to the audiovisual destination.

22. The method of claim 19, wherein the audiovisual destination comprises a display device.

23. The method of claim 19, wherein the second output interface is connectable to the host system.

24. The method of claim 19, wherein the output interface and the second output interface comprise a common interface.

\* \* \* \* \*